(12) United States Patent
Erhard et al.

(10) Patent No.: US 12,736,435 B2
(45) Date of Patent: Sep. 15, 2026

(54) DEVICE AND METHOD FOR LASER BEAM CAUSTIC MEASUREMENT AND LASER BEAM SYSTEM

(71) Applicant: TRUMPF Lasersystems for Semiconductor Manufacturing SE, Ditzingen (DE)

(72) Inventors: Steffen Erhard, Korntal-Münchingen (DE); Viktor Granson, San Diego, CA (US); Clemens Kieninger, Stuttgart (DE); Andreas Herdt, Darmstadt (DE); Vincent Hahn, Karlsruhe (DE)

(73) Assignee: TRUMPF LASERSYSTEMS FOR SEMICONDUCTOR MANUFACTURING SE, Ditzingen (DE)

( * ) Notice: Subject to any disclaimer, the term of this patent is extended or adjusted under 35 U.S.C. 154(b) by 80 days.

(21) Appl. No.: 18/808,169

(22) Filed: Aug. 19, 2024

(65) Prior Publication Data

US 2026/0049895 A1 Feb. 19, 2026

(51) Int. Cl.
*G01M 11/02* (2006.01)
*B23K 26/70* (2014.01)
(Continued)

(52) U.S. Cl.
CPC ....... *G01M 11/0257* (2013.01); *B23K 26/705* (2015.10); *G01J 1/0411* (2013.01); (Continued)

(58) Field of Classification Search
CPC ......... G01M 11/0257; G01M 11/0207; G01M 11/0221; H01S 3/0014; B23K 26/705; G01J 1/4257; G01J 1/0411
See application file for complete search history.

(56) References Cited

U.S. PATENT DOCUMENTS 3,315,581 A * 4/1967 Ruhle .................... G03B 17/08 D16/217
5,909,274 A * 6/1999 Stucchi ................ G01J 1/4257 356/121

(Continued)

FOREIGN PATENT DOCUMENTS

WO WO 2018108440 A1 6/2018
WO WO 2021004717 A1 1/2021

OTHER PUBLICATIONS

Hahlweg Cornelius et al. "Lambert's 1,8-13multiple reflection model revisited,", Optical Modeling and Performance Predictions V, Sep. 2011, p. 1-10, vol. 812707, SPIE, Bellingham, Washington, USA.

*Primary Examiner* — Kara E. Geisel
*Assistant Examiner* — Jonathon Cook
(74) *Attorney, Agent, or Firm* — LEYDIG, VOIT & MAYER, LTD.

(57) ABSTRACT

A device for measuring caustic parameters of a laser beam includes a beam splitter for splitting the laser beam into at least three spatially separated partial beams, and a detection unit for detecting images of the partial beams. A beam path from an input of the device to the beam splitter defines a beam axis for the laser beam, along which the laser beam propagates until entering the beam splitter. The beam splitter includes an optical lens, and a partially reflective surface configured to split the laser beam into the at least three partial beams by partial reflection within the optical lens. The optical lens is positioned off-axis such that an optical axis of the optical lens extends off-axis to the beam axis, and/or the optical lens is tilted such that the optical axis of the optical lens forms an angle with the beam axis that deviates from 0°.

14 Claims, 3 Drawing Sheets

(51) Int. Cl.
*G01J 1/04* (2006.01)
*G01J 1/42* (2006.01)
*H01S 3/00* (2006.01)

(52) U.S. Cl.
CPC ....... *G01J 1/4257* (2013.01); *G01M 11/0207* (2013.01); *G01M 11/0221* (2013.01); *H01S 3/0014* (2013.01)

(56) References Cited

U.S. PATENT DOCUMENTS

| | | | |
|---|---|---|---|
| 11,029,214 | B2 | 6/2021 | Wattellier et al. |
| 11,099,400 | B2 * | 8/2021 | Manger .................. G02B 27/10 |
| 2019/0377267 | A1 | 12/2019 | Oemrawsingh et al. |
| 2020/0088570 | A1 | 3/2020 | Granson et al. |
| 2021/0003445 | A1 | 1/2021 | Blázquez-Sánchez et al. |
| 2022/0163787 | A1 * | 5/2022 | Von Elm ............ G02B 27/0068 |
| 2022/0341778 | A1 | 10/2022 | Kramer et al. |

* cited by examiner

DEVICE AND METHOD FOR LASER BEAM CAUSTIC MEASUREMENT AND LASER BEAM SYSTEM

FIELD

Embodiments of the present invention relate to device and method for laser beam caustic measurement, and to a laser beam system.

BACKGROUND

Laser beam systems are used in a wide variety of applications. A particular use for laser beam systems is in the generation of extreme ultraviolet radiation (EUV radiation). In this process, a suitable material, especially a tin droplet, is illuminated with a laser beam so that the desired EUV radiation is produced. Laser beam systems for EUV generation are used, for example, in a cleanroom environment in the manufacturing process of semiconductors.

For laser beam systems, in particular for EUV generation, it is important before their intended use to ensure that the laser beam system, and especially the laser beam itself, meets predefined specifications. These specifications may include safety-relevant factors as well as factors that determine the quality and performance of the laser beam.

To ensure this intended state of the laser beam system, or the laser beam, the beam caustic of the laser beam is typically measured and evaluated. If the beam caustic does not fall within the predefined specifications, the optical setup of the laser system is usually adjusted or replaced. It is common for the beam caustic to be measured multiple times and for corrections to the optical setup to be made before the specifications are met and the laser can be put into operation.

One conventional method involves capturing the laser beam caustic with a measuring device having at least one camera moveable in the direction of propagation of the laser beam to the predefined positions. The laser beam is typically aimed directly at the camera. For an ISO11146-1-conform measurement, camera images of at least ten predefined positions are typically captured. From the camera images, the beam caustic is then determined using statistical methods, in particular by means of a fitting function.

This method however has the disadvantage that a multitude of measurements need to be taken at different positions of the laser beam. This represents a considerable measurement effort. Additionally, it is often necessary to repeat the measurement to adjust the optical equipment several times, thereby increasing the measurement effort even further. Furthermore, the device necessary to perform the method is technically complex and therefore cost-intensive.

In addition, the desired measurement positions of the laser beam caustic are typically fixed and cannot be changed without affecting the statistical evaluation. In particular, measurements at locations of the laser system hard to reach can only be carried out if the system is partially dismantled and then reassembled. This further increases the measurement effort and thereby the time and cost expenditure.

In addition, the method requires a mechanical actuation of the camera along the laser beam propagation direction. The camera actuation can either be performed manually, which is labour intensive. Alternatively, the camera actuation can be performed using precise motorized actuators, which are cost intensive. In particular, cleanroom compatible actuators are especially cost intensive. Moreover, a considerable volume of space is required to perform the method.

Another method involves determining of the caustic parameters of the laser beam by using a so-called lens revolver. The lens revolver typically comprises several lenses with a predetermined focal length that can be arranged in the laser beam by rotating a drum, thereby generating different beam diameters on a fixed camera. For a given focal length and the respective measured diameter of the laser beam on the camera, the beam diameters at different positions of the laser beam and then the caustic parameters can be determined. Such a method and device is exemplary known from US 2020/0088570 A1.

However, the method known in the prior art is time consuming. Additionally, the lens revolver is technical complex, cost-intensive and has several movable parts that are prone to errors.

WO 2021 004 717 A1 outlines a measurement system for light amplification cavities, splitting an input beam to generate two images on different optical paths. These images are detected to determine the beam's position and direction for precise applications like semiconductor lithography.

WO 2018 108 440 A1 describes a system for aligning a laser beam to a desired position and direction in a reference plane. Using diffraction of light by a hologram, various diffraction orders are projected onto a detection plane to adjust and fine-tune the beam's alignment.

The methods proposed in the prior works, WO 2021 004 717 A1 and WO 2018 108 440 A1, with the associated devices are designed to measure a laser beam position and propagation direction. The methods are in general not designed to measure a laser beam caustic, meaning that the location of beam waist in propagation direction z and beam waist size w0 cannot be determined. Precise adjustment of the laser beam caustic is therefore not possible.

SUMMARY

Embodiments of the present invention provide a device for measuring caustic parameters of a laser beam. The device includes a beam splitter for splitting the laser beam into at least three spatially separated partial beams, and a detection unit for detecting images of the at least three partial beams spatially separated from each other. A beam path from an input of the device to the beam splitter defines a beam axis for the laser beam, along which the laser beam propagates until entering the beam splitter. The beam splitter includes at least one optical lens with an optical axis and a partially reflective surface configured to split the laser beam into the at least three partial beams by partial reflection within the optical lens. The optical lens is positioned off-axis such that the optical axis of the optical lens extends off-axis to the beam axis, and/or the optical lens is tilted such that the optical axis of the optical lens forms an angle with the beam axis that deviates from 0°.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
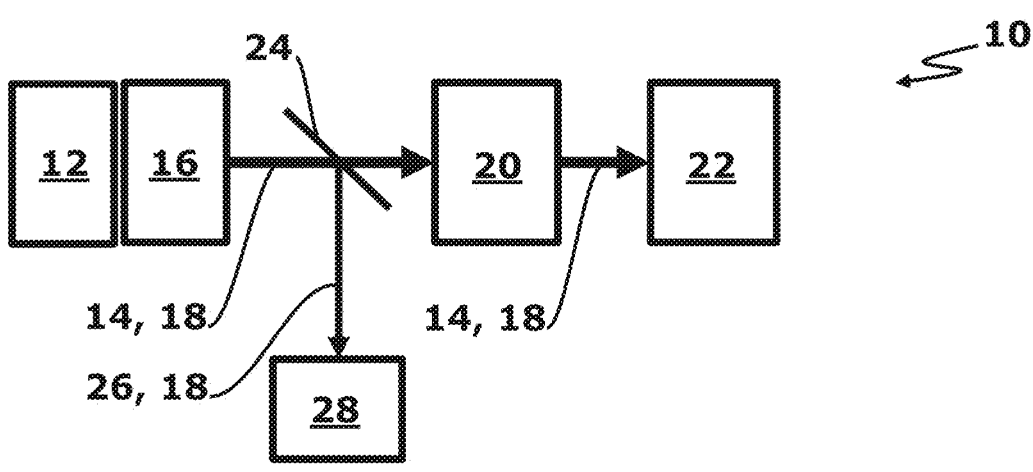
FIG. 1 schematically shows a laser beam system having an optical device and a device for measuring caustic parameters of a laser beam according to some embodiments.

Embodiments of the invention provide a method and a device with which the beam caustic of the laser beam can be measured instantaneously and in-situ in a technically simple, cost-effective manner without moving parts.

Embodiments of the present invention provide a device that is suitable and designed for measuring caustic parameters of a laser beam. Caustic parameters are parameters of the laser beam that determine the size of the beam in its propagation direction. Beam caustic parameters include, but are not limited to, the waist position of the laser beam, beam diameters at various positions, a waist diameter of the laser beam, a divergence angle of the laser beam, a Rayleigh length and/or a beam quality factor of the laser beam. The laser beam may have different caustic parameters along different transverse directions. A general astigmatic beam can be described by ten caustic parameters, their second moments, as described in ISO11146-2.

Preferably, the device is suitable and designed for measuring pointing and position of the laser beam. In particular, the device is suitable and designed for measuring pointing and position of the laser beam as well as caustic parameters of a laser beam at the same time by taking a single camera image. This allows the device to be used effectively.

The device comprises at least one beam splitter unit. The beam splitter unit is suitable and designed for splitting the laser beam into at least three spatially separated partial beams. The inventors have recognized that the beam caustic can be determined effectively and accurately with three partial beams while at the same time making the device more cost-effective.

Typically, the beam splitter unit may fulfill two functions. First, the incident laser beam power is split into at least three output beams. Second, the beam splitter unit ensures that the output beam waist location or the output beam waist diameter or both differ for at least three of the at least three output beams. In the following, the output beams are referred to as 'partial beams'. Furthermore, the beam splitter ensures that the at least three partial beams are angularly and/or spatially separated. In other words, the beam splitter unit is designed to enable lateral separation of multiple beams on an imaging plane of the detection unit. This allows the partial beams to be imaged without overlapping.

It may be provided that the beam splitter unit is designed to generate five or more, preferably six or more, preferably seven or more, spatially separated partial beams. More partial beams can further increase the accuracy of the measurement.

The device comprises an input. The input is designed to let the laser beam into the device. In other words, the laser beam enters the device via the input. The device also comprises a beam path from the input of the device to the beam splitter unit. The beam path defines a beam axis for the laser beam, along which the laser beam can propagate until entering the beam splitter unit.

According to embodiments of the invention, the beam splitter unit comprises at least one optical lens. The at least one optical lens has a partially reflective surface. The term partially reflective is to be understood previously and subsequently as a property of the surface that causes a proportionate reflection and transmission of incident electromagnetic waves, in particular laser radiation. In other words, a portion of the laser beam entering the lens is prevented from leaving the lens and is reflected within the lens, creating a partial beam. Another portion of the laser beam is transmitted through the surface and leaves the lens creating another partial beam. Therefore, the partially reflective surface is designed to split the laser beam by partial reflection within the lens.

The at least one optical lens may be designed as a diverging lens or a converging lens.

The laser beam and/or the partial beam can be reflected several times at the partially reflective surface within the optical lens, resulting in further partial beams.

The at least one optical lens has an optical axis, which connects the centres of curvature of the lens surfaces. Typically, the at least one optical lens has a central axis perpendicular to the optical axis. The optical lens is positioned off-axis such that the optical axis of the optical lens extends off-axis to the beam axis of the device. Additionally or alternatively, the optical lens is tilted such that the optical axis or a virtual representation of the optical axis includes an angle with the beam axis of the device that deviates from 0°. In other words, the central axis or a virtual representation of the central axis of the optical lens includes an angle with the beam axis of the device that deviates from 90°.

In other words, the at least one optical lens may be arranged off-centre to the laser beam propagation direction so that the laser beam may be directed onto the optical lens off-centre to an optical axis of the lens and/or a system centre line of the device. This ensures that the partial beams propagate in different directions. Alternatively or additionally, the at least one optical lens may be tilted with respect to the incident laser beam propagation direction. This also ensures that the partial beams propagate in different directions.

A system centre line can previously and subsequently be understood as a compensation curve, in particular a compensation line, between the centres of the optical lenses and preferably a centre point of the imaging plane of the device. The geometric axis of individual lenses can be arranged at a distance from the system centre line, in particular parallel.

Additionally, the device comprises a detection unit. The detection unit is suitable and designed for detecting images of the partial beams generated by the beam splitter unit. In other words, the partial beams of the laser beam generated by the unit are directed to the detection unit, which determines a position and diameter of each spatially separated partial beam.

Due to the beam splitting within the beam splitter unit, the partial beams hit the imaging plane at a distance from each other. In other words, spatially separated images are generated. This means that the images generated by the partial beams can be analysed simultaneously.

Typically, the detection unit has at least one imaging plane for detecting the partial beams. Furthermore, the detection unit can have several separate or spaced imaging planes. Each of the imaging planes can be designed to detect one or more partial beams. The imaging plane can be a camera sensor, for example a CMOS, a CCD, a microbolometer camera, and/or a pyroelectric camera. The detector component can also consist of several cameras, for example one camera per partial beam. Typically, the imaging plane has a sufficient spatial resolution for reliably detecting the beam diameter of the partial beam.

Typically, the detection unit is connected to or comprises a computing unit for analysing the data transmitted from the imaging plane. Preferably, the images of the partial beams on the imaging plane are analysed using image evaluation algorithms. In a first step, the image data is subdivided in region-of-interest sub images, where each sub image is containing data only pertaining to individual ‘partial images’. The evaluation can include the determination of a centroid point of each partial image, a diameter of each partial image and/or a brightness of each partial image. The list is not intended to be exhaustive.

As described above, a device for measuring caustic parameters is provided according to embodiments of the invention, in which partial beams are generated from a laser beam using at least one optical lens with a partially reflective surface and are detected via a detection unit. Due to the elongated beam path of the partial beam forced by the reflection in conjunction with a known optical focus length of the optical lens, a position along the direction of propagation of the laser beam can be inferred. By measuring the diameter of a respective partial beam at the detection unit a diameter of the laser beam at the position along the direction of propagation can be calculated. By determining three or more, preferably four or more, diameters of the laser beam and their respective position along the propagation direction, the beam caustic can be calculated in a technically simple but reliable and precise manner. The proposed device also has further advantages. First, the proposed device is able to measure the caustic parameters of the laser beam instantaneously during the operation of the laser beam system without disassembling which saves considerable time and money. In addition, the measurement of the caustic parameters can be carried out without moving parts that are prone to errors. This allows the measurement to be carried out reliably without major maintenance efforts.

A preferred embodiment of the device has a beam splitter unit comprising at least one further optical lens. The further optical lens may be positioned off-axis such that the optical axis of the further optical lens extends off-axis to the beam axis and/or tilted such that that the optical axis or a virtual representation of the optical axis of the further optical lens forms an angle with the beam axis that deviates from 0°. In other words, the further optical lens is arranged off-centre to the beam propagation direction of at least one of the partial beams generated by the at least one optical lens. The further optical lens is designed to image at least one further partial beam.

Preferably, the further optical lens is designed to shift the imaging planes of the partial images on the detection unit. Furthermore, the further optical lens may be designed to accommodate the partial beams on the detection unit without overlap between the partial beams. Moreover, the further optical lens may be designed to ensure that the resulting power density on the detection unit does not exceed the detection-unit damage-threshold.

The further optical lens may precede or succeed the partially reflectively lens. The further optical lens may be coated with an anti-reflective coating.

In a preferred further development of the device, the beam splitter comprises a beam deflection module between the optical lens and the further optical lens. The deflection module is arranged in the propagation direction of at least one of the partial beams generated by the at least one optical lens. The deflection module can have one or more partially reflective mirrors. A deflection module enables laser beams and/or partial beams to be splitted and deflected. This allows further partial beams to be generated and/or existing partial beams to be changed spatially in their image on the detection unit. This improves the evaluation. The deflection module may be combined with a further optical lens that has an essentially non-reflective coated surface.

Preferred is a further development of the device, wherein the further optical lens comprises a partially reflective surface designed to split at least one of the partial beams generated by the at least one optical lens into at least one further partial beam by partial reflection within the further optical lens. This allows additional partial beams to be generated for measuring further positions of the laser beam without the need for additional optical elements. This has a favourable effect on the compactness of the device.

Preferably, the beam splitter unit can comprise further optical lenses with a partially reflective surface or optical lenses in combination with a beam deflection module operating in an analogous way. This further increases the measuring range of the device.

In a preferred further development of the device, it is provided that the at least one optical lens is arranged such that its optical axis is spaced apart from and parallel to the optical axis of the further optical lens. Alternatively, it is provided, that the at least one optical lens is arranged such that its optical axis or a virtual representation of the optical axis includes an angle with the optical axis of the further optical lens. This allows the partial beams to be imaged on the imaging plane in different locations.

In a very preferred further development of the device, it is provided that the at least one optical lens is arranged off-axis in a first deflection direction perpendicular to the system centre line of the device. In addition, it may be provided that the further optical lens is arranged off-centre or tilted or both in a second deflection direction perpendicular to the system centre line of the device. Preferably, the propagation direction of the laser beam directed at the beam splitter unit is parallel to the system centre line of the device. This allows the partial beams to be deflected in two predefined directions, which simplifies the assignment of the images on the detection unit to the partial beams.

In another preferred further development of the device, it is provided that the first deflection direction is arranged perpendicular to the second deflection direction. This arrangement distributes the partial beams in two dimensions which makes it easy to assign the images. Furthermore, a two-dimensional distribution of partial beams may permit the efficient use of detector area.

In a preferred embodiment of the device the beam splitter unit comprises an auxiliary lens arranged along the beam propagation direction of the laser beam and/or at least one of the partial beams. The position of the image of the partial beams on the detection unit can be set precisely using an auxiliary lens. In addition, the brightness of the images can be adjusted to improve recognisability. This allows beam imaging errors on the imaging plane to be minimized or prevented.

In a preferred further development of the device, the auxiliary lens is arranged between the at least one optical lens and the at least one further optical lens. This allows beam imaging errors on the imaging plane to be minimized or prevented even more effectively.

In a preferred embodiment of the device, a primary optical plane of at least one optical lens is arranged at an angle to the imaging plane of the detection unit. Preferably, the primary optical plane of every optical lens is arranged at an angle to the imaging plane of the detection unit. This reliably prevents disturbing reflections from the imaging plane.

Further preferred is an embodiment of the device, wherein the detection unit comprises a single imaging plane for imaging all partial beams. This allows the detection unit to be designed in a simple and cost-effective way.

In a preferred embodiment of the device, the beam splitter unit is designed to image a position in the far-field of the laser beam with at least one partial beam and positions in the near-field of the laser beam with at least one partial beam. This allows the beam caustics to be determined accurately and reliably.

The objective is also solved by a laser beam system.

The laser beam system comprises a laser beam generator and at least one optical assembly. The optical assembly is in particular suitable and designed for generating extreme ultraviolet radiation.

Additionally, the laser beam system comprises at least one device for measuring caustic parameters of a laser beam described above and below.

The objective is further solved by a method.

The method is suitable and designed for measuring caustic parameters of a laser beam. The method is carried out in particular with a device for measuring beam caustic parameter of a laser beam described above and below.

The method comprises at least the steps below:

- One step of the method involves providing a measuring laser beam. The measuring laser beam is preferably provided by splitting the laser beam.
- Another step of the method involves splitting of the measuring beam into partial beams by partial reflection within at least one optical lens with a partially reflective surface.
- Another step of the method involves measuring beam diameters of the respective partial beams by detecting images of the partial beams on an imaging plane.
- Another step of the method involves calculating at least one caustic parameter of the laser beam based on the measured beam diameters. In particular, determination of a beam divergence and/or waist position of the laser beam.

The method may provide for an optical assembly to be adjusted on the basis of the determined caustic parameters.

Further advantages of the invention can be seen from the description and the drawing. Likewise, the above-mentioned and the still further described features can be used according to embodiments of the invention in each case individually or as a plurality in any desired combination. The embodiments shown and described are not to be understood as a conclusive list, but rather have an exemplary character.

FIG. 1 schematically shows an overview of a laser beam system 10. The laser beam system 10 is suitable and/or designed for generating extreme ultraviolet (EUV) radiation. In other words, the laser beam system 10 is designed to irradiate a target material (not shown), in particular a drop of tin (not shown), in order to generate EUV radiation.

The laser beam system 10 comprises a beam generator 12 for generating a laser beam 14. Furthermore, the laser beam system 10 comprises an optical assembly 16. The laser beam generator 12 is positioned upstream of the optical assembly 16 in the laser beam propagation direction 18 (represented by the direction of the arrows).

The optical assembly 16 is designed to output the laser beam 14. Preferably, the approximate caustic parameters of the laser beam 14 effected by the optical assembly 16 are known. In particular, a near field and/or a far field of the laser beam 14 can be determined quickly if the approximate beam caustic parameters are known. As a result, the adjustment of the laser beam 14 can be carried out effectively and quickly.

As shown by FIG. 1, the laser beam system 10 may have at least one further optical assembly 20 effecting the caustic parameters of the laser beam 14. For example, a focussing unit. Additionally, the laser beam system 10 may have a target chamber 22 in which the laser beam 14 is focussed on the tin droplet to generate the EUV radiation. Adjusting the beam caustic upstream of the optical assembly 20 increases the accuracy of the beam shape by the optical assembly 20, allowing the laser beam 14 to be focussed precisely on the tin droplet.

Furthermore, the laser beam system 10 may have a beam splitter 24 for splitting a measuring laser beam 26 out of the laser beam 14. The beam splitter 24 typically has partially reflective properties.

The laser beam system 10, as shown by FIG. 1, comprises at least one device 28 for measuring caustic parameters of the laser beam 14. The device 28 on the measuring laser beam 26 can measure the caustic parameters of the laser beam 14.

It should be mentioned that the laser beam system 10 can have several devices 28 for measuring the caustic parameters of the laser beam 14 at different positions along the direction of propagation 18 of the laser beam 14. Preferably, the laser beam system 10 has a device 28 before and/or after each sub-device of the laser beam system 10 that influences the caustic parameters of the laser beam 14. For example, before and/or after the optical assemblies 16, 20.

Figure 2:
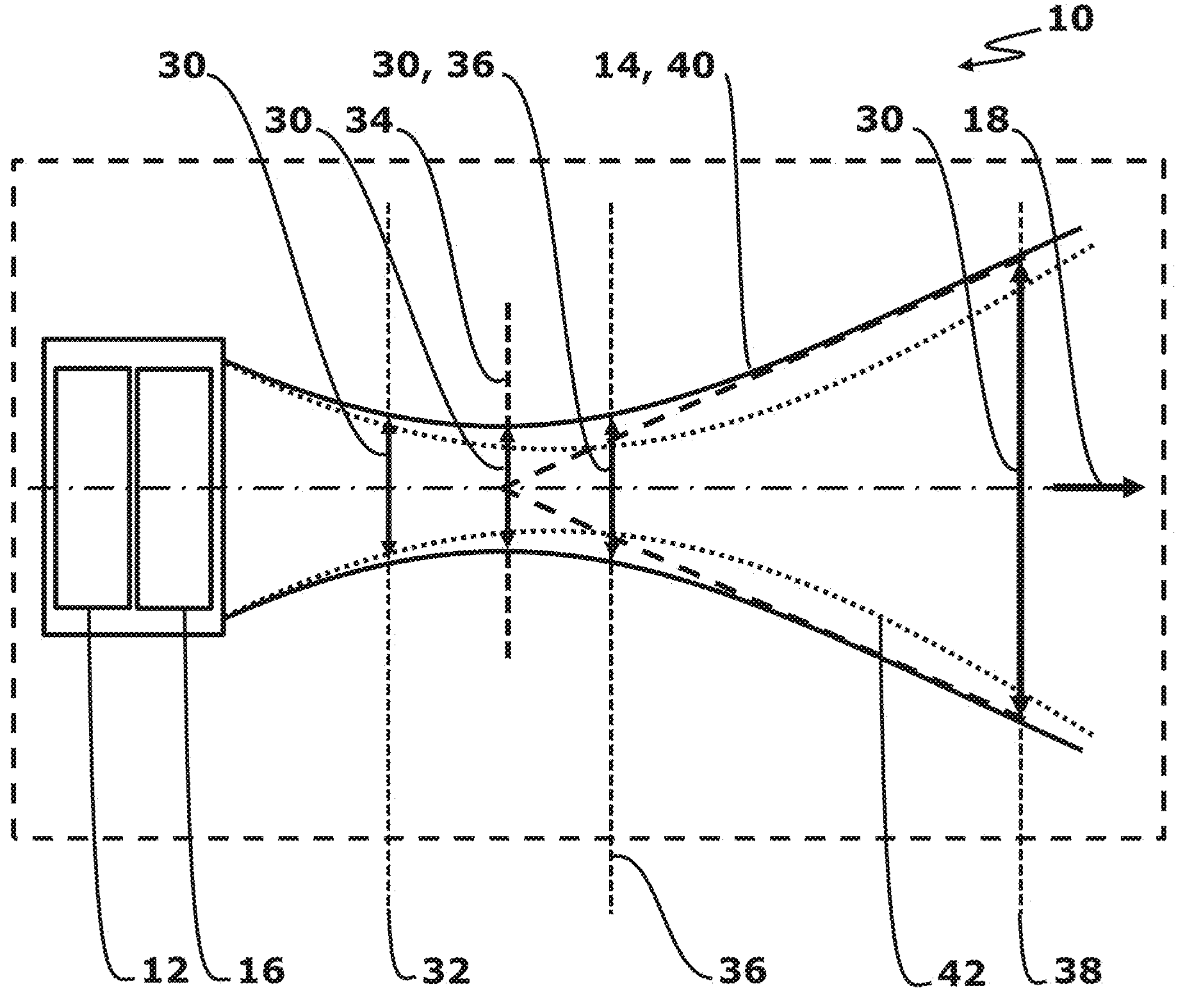
FIG. 2 schematically shows a partial view of the laser beam system according to some embodiments.

FIG. 2 schematically shows a more detailed but partial view of the laser beam system 10 without the beam splitter 24 (see FIG. 1) to illustrate the caustic properties of the laser beam 14.

As shown, the beam caustic of the laser beam 14 changes in the propagation direction 18 of the laser beam 14 starting from the optical assembly 16. Typically, the laser beam 14 initially has a reducing beam diameter 30 and then a widening beam diameter 30, which leads to a hyperbolic shape of the laser beam 14. To determine the hyperbolic shape, typically three or more diameters 30 of the laser beam 14 are measured at different positions in the propagation direction 18. This allows the beam caustic or the caustic parameters of the laser beam 14 to be determined, for example by curve fitting. The positions are typically predetermined. In other words, the positions along the propagation direction 18 for measuring a diameter are known.

It is preferred that at least one diameter 30 is measured at a position 32 upstream to the waist position 34 along the propagation direction 18 of the laser beam 14. In other words, at least one diameter 30 may be measured in front of the beam waist 34 of the laser beam 14.

It is further preferred to measure at least one diameter 30 of the laser beam 14 in a position 36 downstream relative to the waist position 34 along the propagation direction 18. The position 36 may be within one Rayleigh length from the waist position 34 of the laser beam 14. Furthermore, it is preferred to measure at least one diameter 30 at a position 38 of at least two Rayleigh lengths behind the waist position 34 of the laser beam 14.

If the beam caustic of the laser beam 14 is known, the shape 40 of the laser beam 14 can be adapted to a target shape 42 by adjusting the respective optical assembly 16, 20, here the optical assembly 16.

Figures 3, 4, 5:
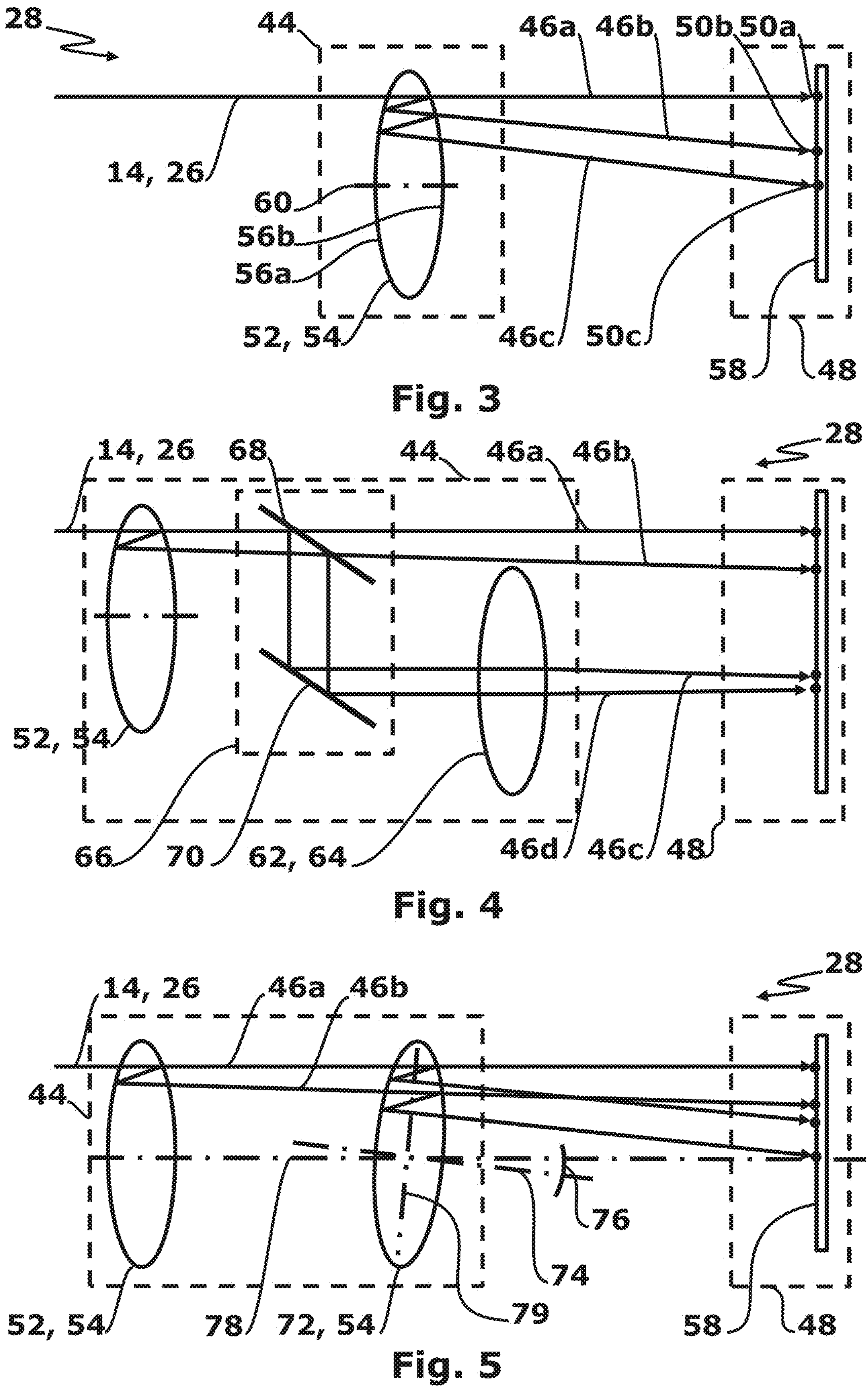
FIG. 3 schematically shows a first embodiment of the device for measuring caustic parameters of the laser beam having a beam splitter unit with an optical lens.
FIG. 4 schematically shows a second embodiment of the device for measuring caustic parameters of the laser beam having a beam splitter unit with two optical lenses.
FIG. 5 schematically shows a third embodiment of the device for measuring caustic parameters of the laser beam having a beam splitter unit with two optical lenses with partially reflective surface.

FIG. 3 schematically shows a first embodiment of the device 28 for measuring caustic parameters of the laser beam 14.

The device 28 comprises a beam splitter unit 44 for splitting the laser beam 14 or the measuring laser beam 26 into at least three spatially separated partial beams 46*a-c*. The device 28 further comprises a detection unit 48 for detecting images 50*a-c* of the respective partial beams 46*a-c*.

According to the embodiment shown in FIG. 3, the beam splitter unit 44 comprises one optical lens 52 with a partially reflective surface 54. The optical lens 52 is designed to split the laser beam 14, respectively the measuring laser beam 26 by partial reflection within the lens 52.

It should be noted as generally that the laser beam 14 can be divided into more than three partial beams 46*a-c*. This can increase the accuracy in determining caustic parameters and therefore the beam shape 40 (see FIG. 2).

According to the embodiment shown, the laser beam 14 is transmitted into the optical lens 52 via a first lens surface 56*a* and partially reflected at a second lens surface 56*b* in the direction of the first lens surface 56*a*. The refracted part of the laser beam 14 leaves the beam splitter unit 44 as the first partial beam 46*a*. The reflected portion of the laser beam 14 is then reflected again at the first lens surface 56*a* and directed towards the second lens surface 56*b*, whereby a transmitted portion leaves the beam splitter unit 44 as the partial beam 46*b*. The partial beam 46*c*, according to FIG. 3, is generated in the same way.

The various partial beams 46*a-c* differ in their travelled path to the detection unit 48 due to multiple reflections within the optical lens 52. Moreover, the detected images of partial beams 46*a-c* differ in their conjugate image plane due to the different effective focal lengths caused by the different refractive and reflective surfaces encountered. As a result, the laser beam 14 can be effectively captured at various positions, for example at position 32, 34, 36, 38 (see FIG. 2) along the propagation direction 18.

The partial beams 46*a-c* are directed by the optical lens 52 towards the detection unit 48, thereby generating an image 50*a-c* of each respective partial beam 46*a-c* on an imaging plane 58 of the detector unit 48. The images 50*a-c* each comprise a light spot, the size of which being affected by their respective effective focal length, caused by the different number of internal reflections within lens 52. The images 50*a-c* enable the diameter 30 (see FIG. 2) of the laser beam 14 to be determined at a specific position 32, 34, 36, 38 along the propagation direction 18 of the laser beam 14.

As shown in FIG. 3, the optical lens 52 is arranged off-centre to the laser beam 14 or the measuring laser beam 26. In other words, the laser beam 14 or measuring laser beam 26 is arranged eccentric to an optical axis 60 of the optical lens 52. This causes a predetermined local spatial and angular separation of the partial beams 46 imaged on the detection unit 48. In other words, the images 50*a-d* of the partial beams 46*a-d* are not arranged superimposed but next to each other, in this case at a vertical distance from each other, on the imaging plane 58. This allows the images 50*a-d* to be clearly assigned to the partial beams 46*a-d*. In addition, the evaluation of all partial beams 46*a-d* or the determination of the caustic parameters of each measuring position 32, 34, 36, 38 of the laser beam 14 can be carried out together. This increases the speed of the evaluation.

FIG. 4 schematically shows a second embodiment of the device 28 for measuring caustic parameters of the laser beam 14.

The device 28 comprises a detection unit 48 for imaging, here four, partial beams 46*a-d* generated by the beam splitter unit 44. The laser beam 14 is transmitted into the optical lens 52, thereby split into the partial beams 46*a* and 46*b*. In other words, the beam splitter unit 44 comprises the optical lens 52 with the partially reflective surface 54, which generates two of the four partial beams 46*a-d*.

Additionally, according to the embodiment shown, the beam splitter unit 44 comprises a further optical lens 62. The further optical lens 62 may have an anti-reflective coated surfaces 64, which causes minimum or no reflections within the optical lens 62. The further optical lens 62 is designed to image at least one further partial beam 46*c* and 46*d* on the detection unit 48 spatially separated from the at least two partial beams 46*a* and 46*b* generated by the optical lens 52.

For splitting the partial beams 46*a* and 46*b*, the beam splitter unit 44 comprises, as shown, a beam deflection module 66. The beam deflection module 66 is arranged between the optical lens 52 and the further optical lens 62 in the propagation direction 18 of at least one of the partial beams 46*a-d*, here 46*a* and 46*b*. The deflection module 66 is typically designed to deflect at least one partial beam 46*a-d*. Preferably, the deflection module 66 can be designed to divide at least one partial beam 46*a*, 46*b*, as shown into the partial beams 46*a-d*. The deflection module 66 typically has at least one partially reflective deflection mirror 68 for this purpose. Furthermore, the deflection module 66 can have a further, in this case reflective, deflection mirror 70 that enables the partial beams 46*c* and 46*d* to be aligned essentially parallel to the other partial beams 46*a* and 46*b*.

By splitting and deflecting the partial beams 46*a-d*, the distance travelled by the partial beams 46*c*, 46*d* can be increased, which, in conjunction with the additional optical lens 62, allows further positions 32, 34, 36, 38 of the laser beam 14 along the propagation direction 18 to be measured.

FIG. 5 schematically shows a third embodiment of the device 28 for measuring caustic parameters of the laser beam 14.

The device 28 comprises the detection unit 48 and the beam splitter unit 44. The beam splitter unit 44 comprises a first optical lens 52 and a second optical lens 72. According to the embodiment shown, the first and the second optical lenses 52, 72 each have a partially reflective surface 54.

Typically, the first optical lens 52 and the second optical lens 72 have different focal lengths, allowing different positions 32, 34, 36, 38 of the laser beam 14 to be detected.

The laser beam 14 or the measuring laser beam 26 is split into the partial beams 46*a* and 46*b* by the first optical lens 52, whereby the measuring laser beam 26 is partially reflected and partially transmitted. The partial beams 46*a* and 46*b* are partially transmitted and reflected individually in the second optical lens 72, creating the partial beams 46*c* and 46*d*. Thus, according to the embodiment shown, each of the two optical lenses 52, 72 generates with its partially reflective surface 54 at least two partial beams 46*a-d* from an incoming laser beam 14 or partial beam 46*a-d*.

As shown, the further optical lens 72 can be arranged along the propagation direction 18 of at least one of the partial beams 46*a* or 46*b* between the at least one optical lens 52 and the detection unit 48.

It should also be mentioned that the beam splitter unit 44 can comprise further optical lenses 52, 72 with a partially reflective surface 54 or further optical lenses 62 (see FIG. 4) having an anti-reflective coated surface 64 (see FIG. 4) in combination with a beam deflection module 66 (see FIG. 4).

Generally valid for all embodiments it can be provided that one or each of the optical lenses 52, 62, 72 may have an optical axis 74 that is tilted at an angle 76 with respect to a perpendicular 78 of the imaging plane 58 of the detection unit 48. In other words, a primary optical plane 79 of the optical lens 72, is arranged inclined to the imaging plane 58 of the detection unit 48. In this way, interference due to reflections of the partial beams 46*a-d* from the detection unit 48 can be avoided.

Figure 6:
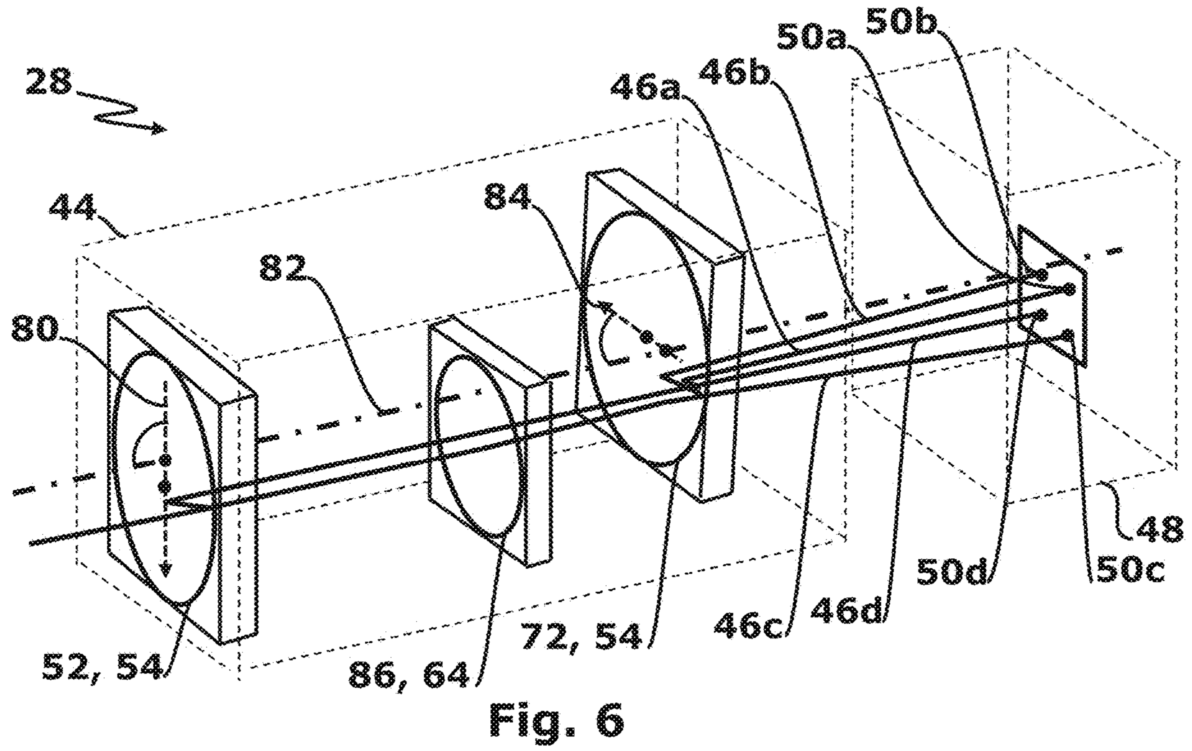
FIG. 6 schematically shows a fourth embodiment of the device for measuring caustic parameters of the laser beam having a beam splitter unit with two optical lenses and an auxiliary lens.

FIG. 6 schematically shows a fourth embodiment of the device 28 for measuring caustic parameters of the laser beam 14 in a perspective view.

The beam splitter unit 44 comprises a first optical lens 52 and a second optical lens 72, both having a partially reflective surface 54, thereby generating the partial beams 46*a-d* directed to the detection unit 48.

As shown, the optical lens 52 may be arranged off-centre in a first deflection direction 80 perpendicular to a system centre line 82 of the device 28 that connects the beam splitter unit 44 with the detector unit 48. The laser beam 14 or measuring laser beam 26 is typically parallel to the system centre line 82.

According to the embodiment, the further optical lens 72 is arranged off-centre in a second deflection direction 84 perpendicular to the system centre line 82. Furthermore, as shown, the first deflection direction 82 can be arranged perpendicular to the second deflection direction 84. This results in a two-dimensional arrangement of the partial beams 46*a-d* imaged on the detection unit 48. This makes it easy to assign the images 50*a-d* to the partial beams 46*a-d*, which further improves the evaluation. Another advantage of a two-dimensional arrangement is much better utilisation of the rectangular detector area.

The beam splitter unit 44 comprises an auxiliary lens 86. The auxiliary lens is arranged between the first optical lens 52 and the second optical lens 72 along the beam propagation direction 18 of at least one of the partial beams 46*a-d*. The auxiliary lens 86 typically has a transparent surface 64. The use of an auxiliary lens 86 makes it possible to shift the imaging positions 32, 34, 36, 38 (see FIG. 2) of the laser beam 14. In addition, an auxiliary lens 86 makes it possible to set the brightness of the images 50*a-d* on the detector unit 48.

Figure 7:
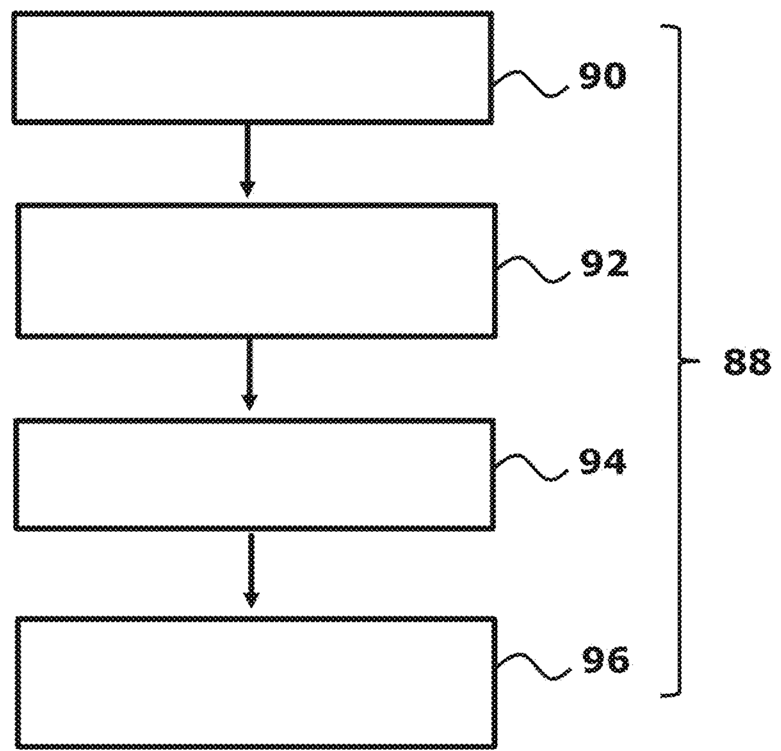
FIG. 7 schematically shows a method for measuring caustic parameters of a laser beam according to some embodiments.

FIG. 7 shows a method 88 for measuring beam caustic parameter of a laser beam 14 (see FIGS. 1-6).

The method 88 is preferably carried out using a device 28 (see FIGS. 1-6) described above and below. The method 88 comprises at least the steps below.

One step 90 of the method 88 involves providing a measuring laser beam 26 (see FIGS. 1-6). The measuring laser beam 26 is preferably provided by splitting the laser beam 14.

Another step 92 of the method 88 involves splitting of the measuring beam 26 into partial beams 46*a-d* (see FIGS. 1-6) by partial reflection within at least one optical lens 52, 72 (see FIGS. 1-6) with a partially reflective surface 54 (see FIGS. 1-6).

Another step 94 of the method 88 involves measuring beam diameters 30 (see FIG. 2) of the respective partial beams 46*a-d* by detecting images 50*a-d* (see FIGS. 3, 6) the partial beams 46*a-d* on a imagine plane 58 (see FIGS. 3, 5).

Another step 96 of the method 88 involves calculating at least one caustic parameter of the laser beam 14 based on the measured beam diameters 30.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

10 laser beam system;
12 beam generator;
14 laser beam;
16, 20 optical assembly;
18 propagation direction;
22 target chamber;
24 beam splitter;
26 measuring laser beam;
28 device;
30 diameter;
32, 34, 36, 38 position;
40 shape;
42 target shape;
44 beam splitter unit;
46*a-d* partial beam;
48 detection unit;
50*a-d* images;
52, 62, 72 optical lens;
54 partially reflective surface;
56*a* first lens surface;
56*b* second lens surface;
58 imaging plane;
60, 74 optical axis;
64 anti-reflective coated surfaces;
66 deflection module;
68, 70 deflection mirror;
76 angle;
78 perpendicular;

79 primary optical plane;
80 first deflection direction;
82 system centre line;
84 second deflection direction;
86 auxiliary lens;
88 method
90, 92, 94, 96 step.

The invention claimed is:

1. A device for measuring caustic parameters of a laser beam, the device comprising:
- a beam splitter for splitting the laser beam into at least three spatially separated partial beams, and
- a detection unit for detecting images of the at least three partial beams spatially separated from each other,
- wherein a beam path from an input of the device to the beam splitter defines a beam axis for the laser beam, along which the laser beam propagates until entering the beam splitter,
- wherein the beam splitter comprises at least one optical lens with an optical axis, the at least one optical lens having an entrance refractive surface and an exit refractive surface that are partially reflective, partial reflections at the entrance refractive surface and the exit refractive surface causing the laser beam to be split into the at least three partial beams, and
- wherein the optical lens is positioned off-axis such that the optical axis of the optical lens extends off-axis to the beam axis, and/or the optical lens is tilted such that the optical axis of the optical lens forms an angle with the beam axis that deviates from 0°.

2. The device according to claim 1, wherein the beam splitter further comprises at least one further optical lens, positioned off-axis such that an optical axis of the further optical lens extends off-axis to the beam axis and/or tilted such that the optical axis of the further optical lens forms an angle with the beam axis that deviates from 0°, wherein the further optical lens is configured to image at least one further partial beam on the detection unit.

3. The device according to claim 2, wherein the beam splitter further comprises a beam deflector arranged between the optical lens and the further optical lens in a propagation direction of at least one of the partial beams generated by the at least one optical lens.

4. The device according to claim 2, wherein the further optical lens comprises a partially reflective surface configured to split at least one of the partial beams generated by the at least one optical lens into at least one further partial beam by partial reflection within the further optical lens.

5. The device according to claim 4, wherein the at least one optical lens is arranged such that the optical axis of the at least one optical lens is spaced apart from and parallel to the optical axis of the further optical lens, or such that the optical axis of the at least one optical lens or a virtual representation of the optical axis of the at least one optical lens forms an angle with the optical axis of the further optical lens.

6. The device according to claim 5, wherein the at least one optical lens is arranged off-axis and/or tilted in a first deflection direction perpendicular to a system centre line, and wherein the further optical lens is arranged off-centre and/or tilted in a second deflection direction perpendicular to the system centre line.

7. The device according to claim 6, wherein the first deflection direction is perpendicular to the second deflection direction.

8. The device according to claim 1, wherein the beam splitter further comprises an auxiliary lens arranged along the beam axis of the laser beam and/or along a beam propagation direction of at least one of the partial beams.

9. The device according to claim 8, wherein the auxiliary lens is arranged between the at least one optical lens and a further optical lens.

10. The device according to claim 1, wherein a primary optical plane of the at least one optical lens is arranged at an angle to an imaging plane of the detection unit.

11. The device according to claim 1, wherein the detection unit comprises a single imaging plane for imaging all of the partial beams.

12. The device according to claim 1, wherein the beam splitter is configured to image a position in a far-field of the laser beam with at least one of the partial beam and a position in a near-field of the laser beam with at least another one of the partial beam.

13. A laser beam system comprising a laser beam generator and an optical assembly, and a device according to claim 1.

14. A method for measuring at least one beam caustic parameter of a laser beam, using a device according to claim 1, the method comprising:
- providing a measuring laser beam;
- splitting the measuring laser beam into multiple partial beams by partial reflection within at least one optical lens, the at least one optical lens having an entrance refractive surface and an exit refractive surface that are partially reflective, partial reflections at the entrance refractive surface and the exit refractive surface causing the laser beam to be split into the multiple partial beams;
- measuring beam diameters of the respective multiplepartial beams by detecting the multiple partial beams on an imaging plane; and
- calculating the at least one caustic parameter of the laser beam based on the measured beam diameters.

* * * * *